United States Patent
Chen et al.

[15] 3,705,486
[45] Dec. 12, 1972

[54] BUSH BERRY HARVESTER

[72] Inventors: Pictiaw Chen; James J. Mehlschau, both of Yolo, Calif.

[73] Assignee: The Regents of the University of California, Berkeley, Calif.

[22] Filed: June 15, 1971

[21] Appl. No.: 153,250

[52] U.S. Cl. ..................................56/330, 56/328
[51] Int. Cl. ...................................A01g 19/04
[58] Field of Search .........56/330, 328 R, 331, 327 R

[56] References Cited

UNITED STATES PATENTS 3,514,936   6/1970   Grover ..................................56/330
3,473,311   10/1969   Fox ......................................56/330
3,452,526   7/1969   R. R. Steingas et al ..........56/328 R Primary Examiner—Louis G. Mancene
Assistant Examiner—J. N. Eskovitz
Attorney—Lothrop & West

[57] ABSTRACT

A bush berry harvester for berries growing on bushes in a row has a carriage movable along the row and carrying a pair of tine grids movable in unison up and down to a selected elevation and movable in unison transversely toward and away from the bushes and also oscillatable in opposite phase in a fore and aft direction at variable amplitude and frequency to dislodge berries onto a conveyor leading to a berry cooler on the carriage.

7 Claims, 6 Drawing Figures

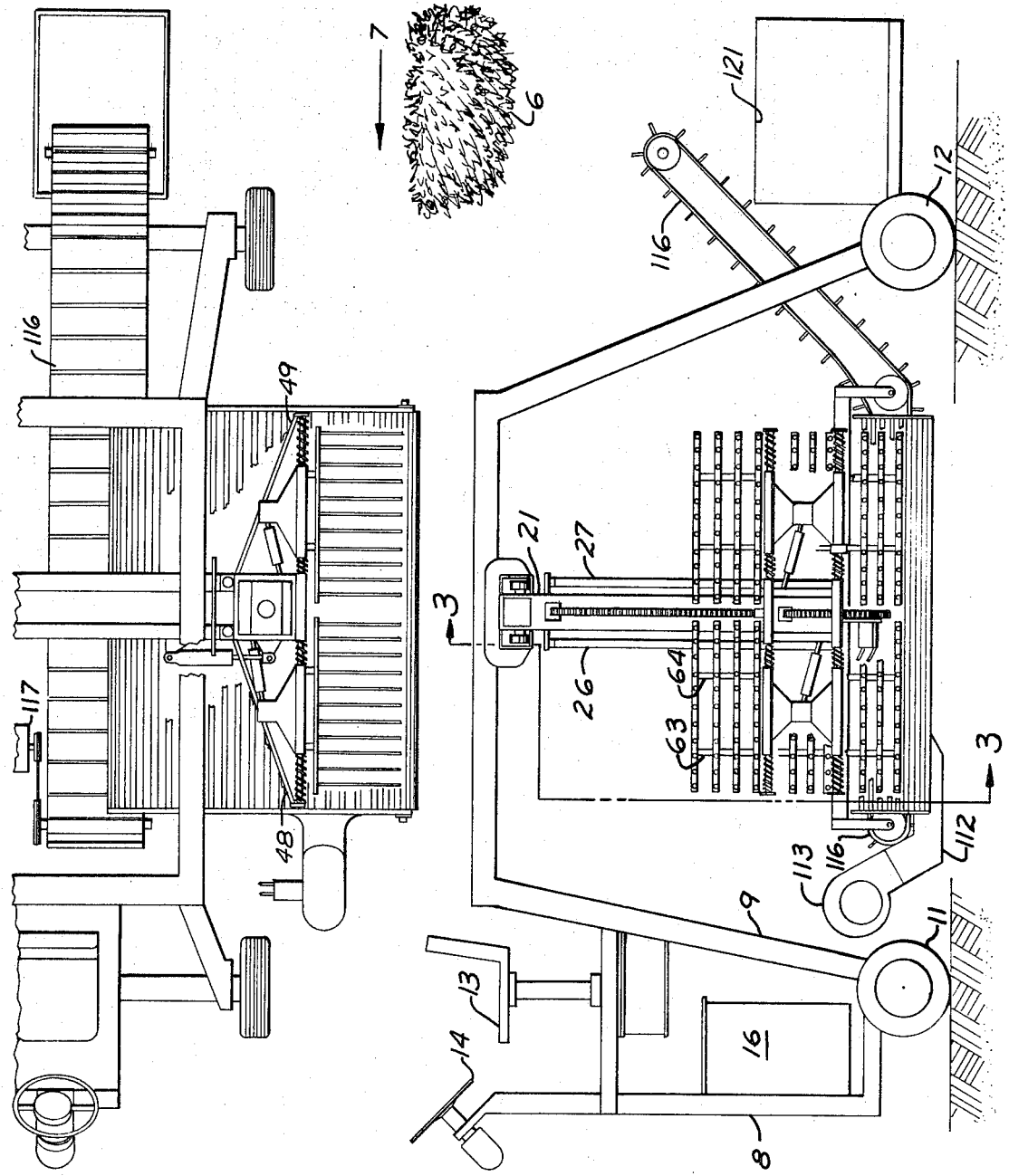

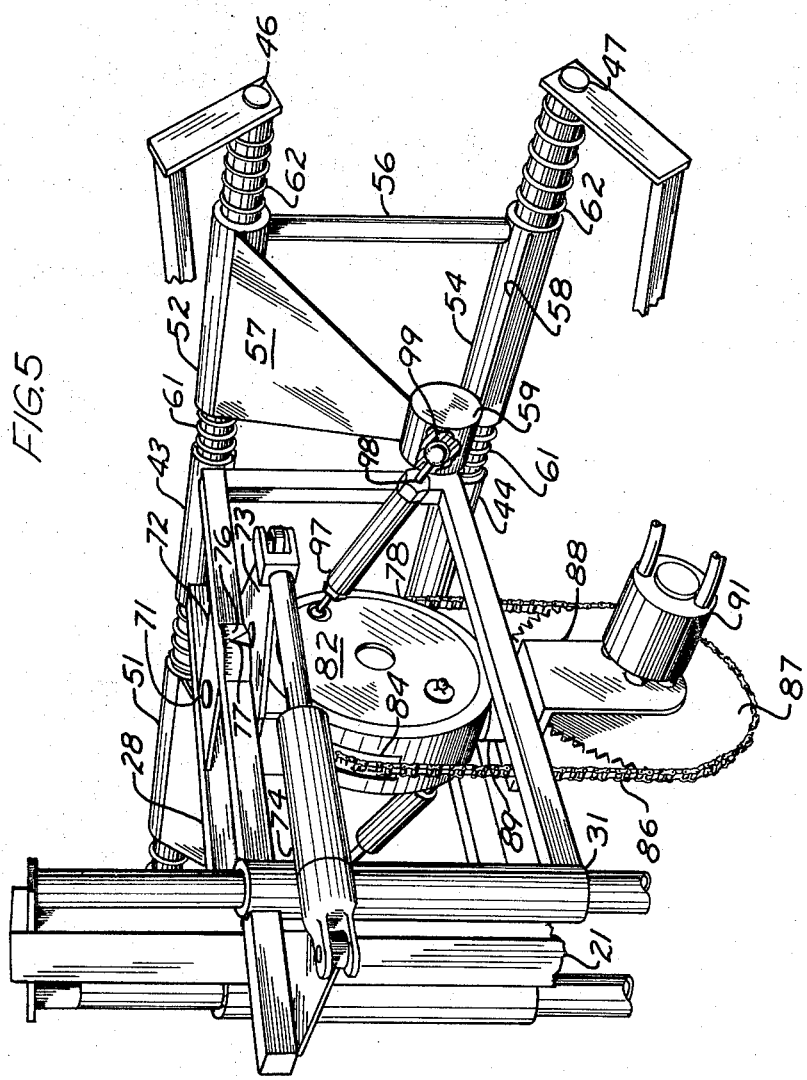
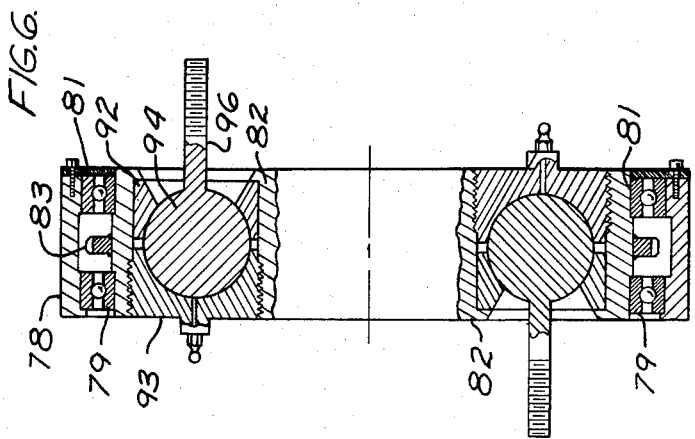

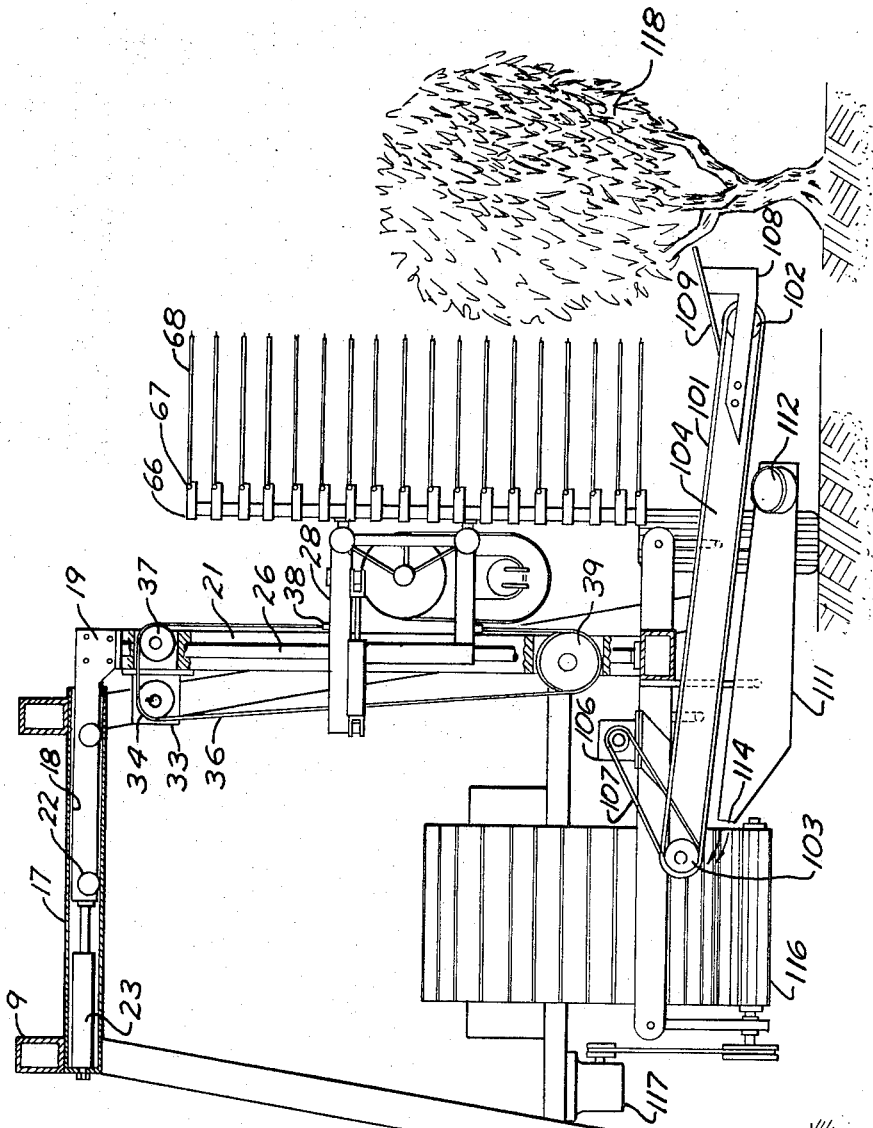
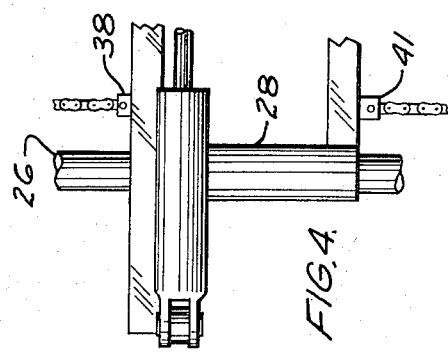

BUSH BERRY HARVESTER

Berries, particularly those which grow on bushes under cultivation in rows, and especially boysenberries and berries of a similar nature, are customarily now largely hand-picked, although there have been some machines developed for removing the berries from the bushes. There is a particular need for an improved and more effective way of removing the berries from the bushes in order that a selective or complete harvest can be made and in order to avoid injury to the berries themselves.

It is therefore an object of the invention is provide a berry harvester that is effective mechanically to remove berries from bushes while maintaining the quality of the harvested berries and, if preferred, making a selective harvesting thereof.

Another object of the invention is to provide a berry harvester that can operate with only ordinarily skilled labor and will reduce in general the amount of labor required to harvest the berries.

A further object of the invention is to provide a berry harvester in which the picking mechanism has an improved operation for careful removal of the berries from the bushes.

An additional object of the invention is to provide means for separating the harvested berries from undesired materials.

An additional object of the invention is to provide a berry harvester in which the berries can be quickly field processed, on the harvester if desired.

A further object of the invention is to provide a berry harvester that is mechanically simple, economical and reliable.

A still further object of the invention is in general to provide an improved bush berry harvester.

While the berry harvester of the invention is useful with various different kinds of berries having sundry different growth habits, it is most useful in connection with and is described as it has been used with boysenberries growing on bushes cultivated in long rows in the field, the rows being spaced apart to provide intervening aisles. Boysenberries are especially of interest since their growing season is usually relatively short, they can be selectively harvested if desired, depending upon their degree of ripeness, and they respond well to a very short interval between the picking time and the processing time.

Other objects of the invention are attained in the embodiment of the invention described in the accompanying description and illustrated in the accompanying drawings, in which:

FIG. 1 is for the most part a side elevation of a harvester constructed in accordance with the invention, certain portions being broken away to disclose the interior construction;

FIG. 2 is a partial plan of the structure shown in FIG. 1, about one-half of the machine being illustrated, some portions being broken away to disclose interior construction;

FIG. 3 is a cross-section, the plane of which is indicated by the line 3—3 of FIG. 1 and the scale being somewhat enlarged;

FIG. 4 is an enlarged detail showing some of the connections of the vertical frame device;

FIG. 5 is an isometric view, portions being broken away, showing part of the drive and associated structure for the tine grid oscillation; and FIG. 6 is a cross-section on a diametrical plane and to an enlarged scale through a part of the oscillator mechanism.

The machine is primarily for use in a field in which berry bushes 6 are planted in rows extending generally in the direction of the arrow 7 in FIG. 2. The machine advances generally in the direction of the arrow and includes a carriage 8 fabricated of the customary shapes and angles and includes a main frame 9 of inverted U-shape in side elevation resting at its forward end on ground-engaging steering wheels 11 and at its rearward end on ground-engaging motive wheels 12. On the frame is an operator's station 13 in the vicinity of a steering wheel 14 for guiding the wheels 11. There are also suitable controls (not shown) for governing the operation of the driving wheels 12. Usually the drive wheels are hydraulically propelled from a power source 16 diagrammatically illustrated. Preferably the power source is an internal combustion engine which operates a hydraulic system affording pressure liquid for steering of the vehicle, for propulsion of the vehicle and also for operating various of the power-requiring instrumentalities, each under appropriate automatic or operator control.

The upper portion of the frame 9 is provided with a transversely extending box beam 17 within which runs one horizontal leg 18 of a frame 19 also inclusive of a depending leg 21. The leg 18 is carried on pairs of wheels 22 operating on the lower flanges of the box beam 17. The frame 19 is projected and retracted by means of an operator-controlled hydraulic jack 23 connected to the frame and to the beam 17 and partially housed within the beam. Under normal conditions, particularly when the machine is not in use and the jack 23 is contracted, the frame 19 is withdrawn. When the jack 23 is energized in the opposite sense, the frame 19 is projected, the movement being a rectilinear one transversely of the direction of the row of berry bushes.

On opposite sides of the frame 21 are mounted a pair of slide tubes 26 and 27 extending vertically and operating as guides for a carriage 28 inclusive of cylindrical sleeves 29 and 31 mounting the slidable carriage and constraining it to vertical translation. The slide as a whole is vertically translated by means of a hydraulically driven motor 33 under control of the operator. On the motor shaft is a sprocket 34 meshing with a link chain 36 passing over a sprocket 37 journalled in the upper portion of the leg 21 and extending to an anchor 38 on the carriage 28. The chain also extends from the sprocket 34 around an idler sprocket 39 similarly journalled in the lower portion of the leg 21 and similarly connected to an anchor 41 on the carriage 28. By appropriately operating the hydraulic motor 33, the operator may lift and lower the carriage between its limits, such motion being vertical in a rectilinear path. The carriage 28 extends outwardly from its support tubes 29 and 31 and is inclusive of a pair of horizontal tubes 43 and 44 appropriately mounted and braced to serve as the support for a pair of parallel, horizontal, longitudinally extending bars 46 and 47 having braces 48 and 49 extending back to the carriage in the vicinity of the support tubes 29 and 31, so that the bars are held quite securely in position.

Particularly pursuant to the invention, there are mounted on the bars a pair of oscillating mechanisms, the description of one applying as well to the other since they are substantially identical. Toward one end of the tubes 43 and 44, for example, there is mounted a slide frame 51 and toward the other end thereof there is mounted a symmetrical slide frame 52. Each of the slide frames includes a pair of tubes 53 and 54 slidably mounted on the bars 46 and 47 and accurately spaced by connectors 56. The tubes 53 and 54 are likewise joined by stiffening plates 57 and 58 to a hub 59. The slide frames 51 and 52 are each substantially cushioned by means of coil springs 61 and 62 on either side thereof bearing against the adjacent stationary parts of the mechanism.

Each of the slide frames carries a pair of upright bars 63 and 64 (FIG. 1) fastened to and therefore movable in unison with the slides. The upright bars are supplied with a number of clips 66, each of which has a longitudinally extending base 67 from which at intervals project a number of tines 68 preferably of metal each covered with a thin plastic tube. The tines 68 are arranged in regular rows and files and so constitute a tine grid for each slide frame when considered as an entirety; that is, all of the tines 68 in connection with one of the slide frames 51 constitute a first tine grid, whereas the similar series of tines 68 associated with the other slide frame 52 constitute a second tine grid.

Particularly pursuant to the invention, it is preferred to oscillate the slide frames 51 and 52 horizontally at the same time or in unison but preferably in opposite phase so that they tend to balance each other as to vibratory forces. As a mechanism for producing the horizontal, rectilinear or longitudinal motion of the tine grids, we have had good success with the arrangement shown herein. As particularly shown in FIG. 5, this arrangement is inclusive of a pivot pin 71 held against axial translation but freely rotatable in a block 72 supported from the carriage 28 for rotation about a vertical axis. Secured to the pin 71 is a control plate 73 to which is secured one end of a hydraulic jack 74, the other end of which is pivotally mounted on the sleeve 31. The jack is connected to the hydraulic mechanism through a suitable operator-supervised control, so that by manipulating the jack 74 in either direction the plate 73 is appropriately rotated about the axis of the pivot pin 71. The instantaneous position of the parts is indicated by an index 76 on the frame 28, with which a pointer 77 cooperates.

Suspended from the plate 73 and pivoting therewith is a ring frame 78 serving as a cage for antifriction bearings 79 and 81 in turn supporting a drum 82, thus journalled for rotation and having a chain sprocket 83 united therewith. Openings 84 are cut in the ring frame 78, so that a chain 86 in engagement with the sprocket 83 can pass through the openings 84 and depend to engage a sprocket 87 suspended in appropriate bearings in a bracket 88 connected to the bearing ring frame 78 by a spacer 89. A hydraulic motor 91 suitably connected to the hydraulic source and under the control of the operator is likewise carried by the bracket 88. With this mechanism, when the jack 74 is actuated to or fro, the entire mechanism depending from the plate 73 likewise rocks about the axis of the pivot 71. Flexible lines to the hydraulic motor 91 permit this. In this fashion, the bearing ring 78, as well as the drum 82, either operate in a plane exactly normal to the vertical plane of the bars 46 and 47 or are tilted about the vertical axis of the pivot pin 71 to one side or the other of such normal position.

To take advantage of this variable setting, there is mounted in the drum 82, preferably at diametrically opposite points and on opposite sides thereof, a pair of substantially identical driving mechanisms. As particularly shown in FIG. 6, the drum at each such location carries a ball support ring 92 which with a ball retainer 93 positions a ball 94 secured to the end of a drive rod 96. The drive rod has threaded shank in adjustable connection with a threaded sleeve 97. At its other end the sleeve is connected by a similarly threaded rod 98 to a ball 99 mounted in the adjacent hub 59.

With this mechanism, when the hydraulic motor 91 is energized, the drum 82 is correspondingly rotated, and if the jack 74 holds the central plane of the drum normal to the bars 46 and 47, the connectors 97 simply gyrate, each in its own conical path, without displacing either of the hubs 59 longitudinally. That means that no oscillatory motion is imparted to either the first tine grid or to the second tine grid. However, when the jack 74 is actuated under control of the operator and the plane of rotation of the drum 82 is swung either to the right or to the left, then the connecting links 97 similarly displace the hubs 59 and a longitudinal, horizontal oscillation of the two slides 51 and 52 is provided. The amplitude in the longitudinal direction of such motion is a function of the angularity of the plane of rotation of the drum 82 with respect to a normal plane. By selecting the amount of such angularity the operator may choose the amplitude of the longitudinal vibration of the two tine grids.

In addition, the operator has control over the speed of the hydraulic motor 91, so that by varying the motor speed the operator can vary the frequency of oscillation of the two tine grids in a longitudinal direction.

Since the two balls 94 are spaced 180° apart, the direction of oscillation of the first tine grid is always exactly opposite to the displacement of the second tine grid. The effect of this arrangement is generally to offset the forces exerted on and by one grid by those exerted on and by the other. Since substantial masses are involved, it has been found that instead of subjecting all of the driving machinery to the maximum forces it is preferable to utilize the cushion springs 61 and 62. Adjacent the opposite ends of the reciprocating longitudinal movement the springs are compressed to serve as shock absorbers and upon the immediately following return stroke act to impart some impetus to the oscillating parts. This reduces the load on the driving mechanism and likewise confines the vibration or oscillation of the two tine banks substantially to their immediate vicinity and lets the remaining frame structure be substantially free of vibration from this source.

Disposed on the frame 9 for resilient lateral yielding so as not to injure a bush and extending beneath the two tine grids is an open conveyor 101 comprised of a number of spaced slats or tubes connected at their ends to chains running over driving drums 102 and 103 situated on a transverse frame 104. A hydraulic drive motor 106 is connected by a chain 107 to the drum 103, so that the upper run of the openwork conveyor is moved from right to left as seen in FIG. 3. Small, heavy debris on the belt falls between the slats and so is discharged. Extensions 108 on the frame 104 hold a deflector plate 109 so that falling materials will be intercepted and transferred to the belt 101.

Disposed beneath the open belt 101 is a duct 111 supplied through a pipe 112 with air under pressure from a blower 113 suitably driven by an appropriate hydraulic motor and effective to afford pressure air for discharge through an outlet opening 114 just beneath the discharge end of the open conveyor 101. Immediately beneath the opening 114 is the upper run of a conveyor 116 driven by a motor 117 and effective to take the material discharged from the open belt 101 that happens to fall thereon. Some of the material discharging from the belt 101 is light and is unwanted. Blast air from the outlet 114 tends to blow such light material away and permits only the heavy, remaining, desired items to be carried on the belt 116.

In the operation of this structure, the carriage is power driven into an aisle alongside of a berry bush 118 (FIG. 3). The carriage is driven in the general direction of the arrow 7 (FIG. 2) until the tine grids, when the leg 18 is in retracted position as shown in FIG. 3, are close to the periphery of the berry bush 118 with the plate 109 as close to the center of the bush as is reasonably possible. The carriage is then stopped opposite the bush and the jack 23 is actuated to project the leg 18, and consequently all of the attached mechanism including the two tine grids, to the right of FIG. 3, so that the tines are plunged substantially full depth into the structure of the bush 118.

Prior to such motion the operator has an opportunity to raise or lower the carriage 28 if necessary, depending upon the height, maturity and growth habits of the bush, so that a maximum coverage of the bush is afforded. Often in a row of similar bushes the height of the slide 28 is established at the beginning of the row and need not be substantially changed thereafter.

The positioned tine grids within the compass of the bush are then vibrated or agitated by operation of the hydraulic motor 91. This rotates the drum 82, and the drum is adjusted at an appropriate angle by operation of the jack 74 to give the amplitude of stroke desired, while the speed of the motor 91 is suitably adjusted to give the speed desired. The two banks or grids of tines are thereupon oscillated toward and away from each other in a direction that is not only horizontal but corresponds with the longitudinal direction 7, there being no rotary, up-and-down or in-and-out motion of the tines at all, the single motion being simply that of a horizontal, longitudinal vibration in the direction of the bush rows and normal to the axis of the various tines. It has been found by experience that this single type of rectilinear translation is most effective to dislodge the berries; for example, boysenberries, from the bushes. It has also been found that, depending somewhat upon the maturity of the berries, the tine amplitude and speed can be so adjusted as to produce a selective picking if that is desired. That is, the tines can engage the berries and shake them so violently that virtually all berries are immediately dislodged from the bush. On the other hand, the speed and amplitude can be so adjusted that perhaps only the most mature berries are picked, leaving the remaining berries to mature and for a subsequent picking.

In any event, the dislodged berries falling from the bush pass downwardly between the tines without substantial injury and eventually land either on the plate 109 or directly upon the upper run of the open conveyor 101. In either case the berries are fed to the left in FIG. 3 and are discharged over the end of the roller 103. The berries are often accompanied by dislodged leaves, twigs, debris and other miscellaneous matter which is relatively light and which is not desired. As all of the material on the belt 101 rounds the drum 103 and falls by gravity, it is traversed by the jet of air from the orifice 114, which tends to blow the leaves and light debris off of the machine and back into the field, whereas the relatively heavy berries fall through the blast directly onto the upper run of the conveyor 116. They are thus cleaned and conveyed in a generally horizontal path and then in an upwardly inclined path for discharge over the upper end of the conveyor 116.

In actual practice we have found it to be highly desirable to process the berries immediately at this point rather than to collect them and transport them to a packing or treatment place. The drawings show diagrammatically a rectangle 121 illustrating a collecting mechanism such as a box or bin adapted to be removed and transported. It is much preferred, and we have found in actual process that it works well, to have the berries discharged from the conveyor 116 fall into a refrigerated chamber represented by the rectangle 121. Since the berries detached from the bushes need no particular further treatment except separation from leaves, twigs, trash and the like, and since that has been accomplished between the conveyors 101 and 116, the material discharging from the conveyor 116 is suitable for immediate processing. The refrigeration chamber 121, preferably operated as a Freon refrigeration structure, receives the berries, takes the field heat out of them almost immediately, and then cools them to a point usually below freezing, so that from time to time there is removed from the carriage the just-picked berries in frozen condition.

After the machine has operated as described at one location in connection with the row of bushes, the operator works certain hydraulic controls to withdraw the tine grids and so that the carriage 8 is again advanced a further step. This is usually equal in length to the over-all length of the two tine grids, and this advance takes the carriage to another point opposite a bush which has not yet been picked. Thereupon the jack 23 is again actuated to project the leg 18 of the frame 19, and the two tine grids are then projected again with the tines being situated within an unpicked bush. The oscillation is resumed by resumption of operation of the motor 91, if it has previously been stopped, and the picking operation continues in this step-by-step fashion all along the row.

What is claimed is:

1. A bush berry harvester for use with a row of berry bushes extending in a predetermined horizontal direction comprising a carriage adapted to advance in said direction, a frame, means for mounting said frame on said carriage for horizontal movement transversely of said direction, means on said carriage for moving said frame horizontally and transversely of said direction, a first tine grid having a first center of mass, means for mounting said first tine grid on said frame for movement of said center of mass in a path parallel to said direction, a second tine grid having a second center of mass, means for mounting said second tine grid on said frame for movement of said center of mass in said path and means on said carriage for simultaneously moving said first tine grid and said second tine grid with said centers of mass moving in said path and in opposite directions relative to said frame.

2. A device as in claim 1 including means for moving said first tine grid and said second tine grid relative to said frame at variable amplitude.

3. A device as in claim 2 in which said tine grid moving means includes a swash plate, means for connecting said swash plate to said first tine grid at a predetermined elevation on said carriage and to said second tine grid at said predetermined elevation, means for rotating said swash plate, and means for altering the plane of rotation of said swash plate.

4. A device as in claim 3 in which said connecting means includes connecting rods connected at one end to said swash plate by ball joints and connected at the other end to said first tine grid and to said second tine grid by ball joints.

5. A device as in claim 1 including a conveyor on said carriage and including spaced apart bars for receiving and conveying berries away from an area on said carriage below said tine grid and including means on said carriage for blowing an air stream upwardly toward said bars near the discharge end of said conveyor.

6. A device as in claim 5 including means on said carriage at the discharge of said receiving and conveying means for cooling material received therefrom.

7. A device as in claim 5 including a second conveyor mounted on said carriage at least in part beneath the discharge of said first open conveyor and beneath said air stream.

* * * * *

UNITED STATES PATENT OFFICE
CERTIFICATE OF CORRECTION

Patent No. 3,705,486   Dated December 12, 1972

Inventor(s) Pictiaw Chen, et. al.

It is certified that error appears in the above-identified patent and that said Letters Patent are hereby corrected as shown below:

On the cover sheet [72] "Yolo, Calif." should read -- Davis, Calif. -- .

Signed and sealed this 1st day of May 1973.

(SEAL)
Attest:

EDWARD M. FLETCHER, JR.
Attesting Officer

ROBERT GOTTSCHALK
Commissioner of Patents